United States Patent
Espenan et al.

(12)
(10) Patent No.: US 6,838,003 B1
(45) Date of Patent: Jan. 4, 2005

(54) METHOD AND DEVICE FOR MEMBRANE FILTERING OF WATER

(75) Inventors: Jean-Michel Espenan, Deyme (FR); Franc Saux, Sainte Foy d'Aygrefeuille (FR)

(73) Assignee: S.A. Polymem, Fourquevaux (FR)

( * ) Notice: Subject to any disclaimer, the term of this patent is extended or adjusted under 35 U.S.C. 154(b) by 0 days.

(21) Appl. No.: 09/744,584

(22) PCT Filed: Jul. 21, 1999

(86) PCT No.: PCT/FR99/01781

§ 371 (c)(1),
(2), (4) Date: Apr. 2, 2001

(87) PCT Pub. No.: WO00/06500

PCT Pub. Date: Feb. 10, 2000

(30) Foreign Application Priority Data

Jul. 28, 1998 (FR) .............................................. 98 09609
Feb. 8, 1999 (FR) .............................................. 99 01674

(51) Int. Cl.[7] .............................................. B01D 61/00
(52) U.S. Cl. ...................... 210/652; 210/651; 210/170; 210/257.2; 210/195.2; 210/321.8; 210/321.88; 210/321.84
(58) Field of Search ................................ 210/652, 651, 210/257.2, 195.2, 321.8, 321.88, 321.84, 170, 321.89

(56) References Cited

U.S. PATENT DOCUMENTS

| 3,616,928 | A | * | 11/1971 | Rosenblatt | ............... 210/321.6 |
| 4,125,463 | A | * | 11/1978 | Chenoweth | .................. 210/636 |
| 4,940,542 | A | * | 7/1990 | Sinizu et al. | |
| 5,045,198 | A | * | 9/1991 | Norton | |
| 5,248,424 | A | | 9/1993 | Cote et al. | |
| 5,607,593 | A | * | 3/1997 | Cote et al. | |
| 5,885,454 | A | * | 3/1999 | Yagihashi et al. | |
| 5,944,999 | A | * | 8/1999 | Chancellor et al. | .......... 210/650 |
| 6,331,251 | B1 | * | 12/2001 | Del Vecchio et al. | |

FOREIGN PATENT DOCUMENTS

| DE | 62-269708 | 11/1987 |
| DE | 0 655 418 | 5/1995 |
| DE | 296 20 426 | 4/1997 |
| JP | 05-277346 | 10/1993 |
| JP | 08-089960 | 4/1996 |
| JP | 09-308882 | 12/1997 |

* cited by examiner

Primary Examiner—Ana Fortuna
(74) Attorney, Agent, or Firm—Crowell & Moring LLP

(57) ABSTRACT

The invention concerns a method for membrane filtering of water, characterized in that the filtering through membranes is performed by using as differential pressure source the water level in the tank wherein the membranes are immersed, and the membranes are of the fiber type with outer skin, substantially arranged in a U-shape and potted in their low section.

19 Claims, 6 Drawing Sheets

METHOD AND DEVICE FOR MEMBRANE FILTERING OF WATER

BACKGROUND AND SUMMARY OF THE INVENTION

The method which is the subject of the present invention is in the field of methods for the production of drinking water for communities. It relates more particularly to the field of membrane filtering methods of the ultrafiltration type.

Conventionally, there are known water purification devices, based on a sand bed upon which the raw water is added. The water passes through the sand bed and is retrieved under the sand freed from a great number of particles, pollutants, etc. These devices have been known for very many years and are particularly widespread in certain countries for the cleansing of waste town water. The United States and Holland can be mentioned in particular.

Most of these devices, dating from tens of years ago or even from more than a century ago, must now be replaced by systems with better performance. In fact they do not all make it possible to achieve water complying with present quality standards at the purifier outlet.

A conventionally offered solution consists in destroying the existing installations and replacing them completely with a new construction adapted to a water purification method of different type, whether by ultrafiltration or another method. It is clear that this replacement is very expensive for communities, both with regard to the new unit construction costs and to the cost of destruction of the previously existing units.

In the prior art there are also known devices using the height of water above membranes to create a pressure difference sufficient for the filtration. Among these documents, a KURITA device described in the Japanese patent abstract Vol. 012 No 155, May 12, 1988, effectively uses the height of water as a pressure generator but in a very complex device, partially mobile in rotation, with superimpositions of long fibers disposed horizontally and potted at their two ends.

Another document (KUBOTA, Japanese patent abstract Vol. 96 No 008, Aug. 30, 1996) relates to a device for treating waste water by membranes placed vertically, the potting being formed by the water, the filtered water being retrieved from the top, with the need for a great height of water in the tank.

This device necessitates an injection of air between the membranes in order to allow correct operation by agitating the waste water around the membranes.

In yet another document (PREUSSAG, patent application DE 296 20 426 U), the fibers are disposed horizontally and potted at their two ends, a vacuum pump being used to create a pressure difference with the waste water tank. A flow of air is necessary in order to agitate the effluents. The retrieval of the filtered water is carried out at the top of the group of membranes, which increases the height of water necessary for the treatment.

These various devices are complex and cannot be installed easily in existing sand bed water treatment installations.

The present invention therefore proposes overcoming these disadvantages by proposing a new method of water purification by filtration.

The purpose of the invention is also to propose a sand bed purifier rehabilitation method which is economical and fast to implement.

According to another objective of the invention, the rehabilitated unit makes the greatest possible use of a large number of elements from pre-existing units, and in particular of the pipes and devices for separating sludges and retrieved clean water.

According to yet another purpose of the invention, this method takes advantage of certain specific arrangements of sand silo purifiers in order to simplify the regulation of the new purifier, thus producing an operational simplification and therefore a saving of labor, regulation equipment and maintenance.

The method according to the invention is therefore a method of water filtration using immersed membranes, of the ultrafiltration membrane type, the filtration through the membranes being carried out using, as a source of differential pressure, the height of water present in the basin in which the membranes are immersed and are of the fibre type with an outer skin, potted at the low point of the said membranes, characterized in that the membranes are disposed in cylindrical containers.

It is understood that this arrangement, of the "filtering floor" type, allows a simple and effective regulation of the filtration pressure, which devices based on pumps do not allow. The situation here is one of operation at constant pressure and with variable flow rate, unlike the existing systems which operate at variable pressure and with a constant flow rate.

The invention also relates to the method of rehabilitation of an existing water purification unit of the so-called sand basin type, comprising a basin provided with a bottom floor, an intermediate floor on which the sand bed stands, a raw water inlet, a high trench for the evacuation of cleaning sludges, characterized in that it comprises stages of removal of the sand bed, of destruction of the intermediate floor, of installation on the bottom floor of a series of membrane ultrafiltration units, the membranes being disposed in containers and the operating pressure of these membranes being created by the height of waste water stored in the basin above these membranes.

The invention also an installation for the filtration of water by membranes, comprising a raw water inlet, a connection to a drain, an outlet means for produced water, the membranes being immersed in a filtration volume filled with water to be filtered, whose height of water above the said membranes is adapted to create a differential pressure sufficient to provoke the filtration through these membranes, in which the membranes are of the fibre type with outer skin substantially disposed in a U-shape, whose two open ends are located at the bottom, the potting being carried out at the low point of the said membranes, characterized in that the membranes are disposed in cylindrical containers.

BRIEF DESCRIPTION OF THE DRAWINGS

The following description and drawings will allow a better understanding of the aims and advantages of the invention. It is clear that this description is given by way of example and is not of limitative nature. In the drawings.

DETAILED DESCRIPTION OF THE DRAWINGS

Firstly, it should be noted that the description relates to a water purification unit created by remaking a previously existing sand bed unit. However, this description is in no way limitative, and the device according to the invention, and the water purification method, can be implemented in a totally new installation.

Figure 1:
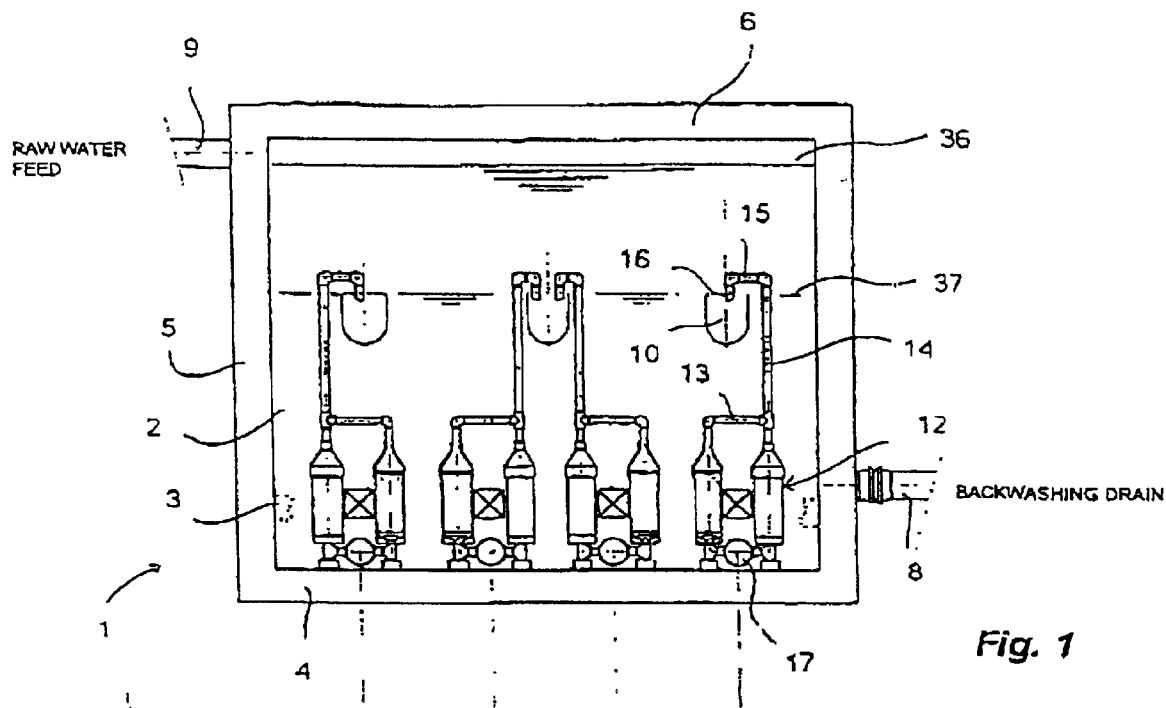
FIG. 1 is a diagrammatic side view of a water filtration installation according to the invention.
Figure 2:
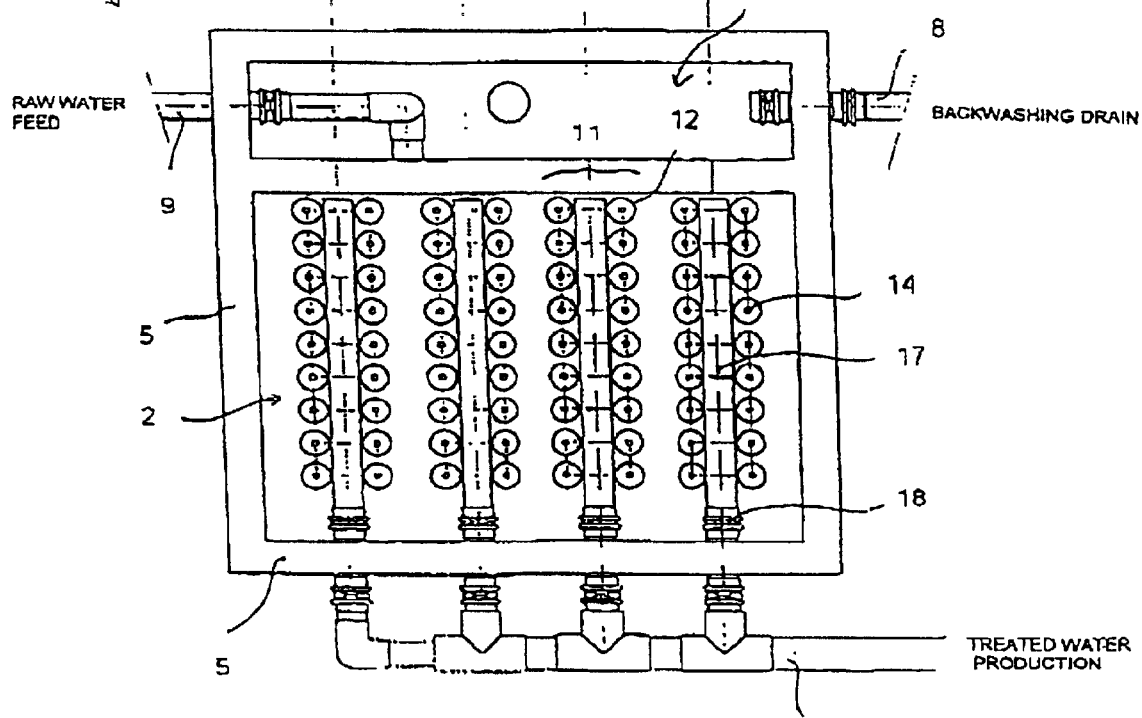
FIG. 2 is a top view of the same installation.

FIGS. 1 and 2 show, in a diagrammatic manner, a sand filter 1 of the conventional type, from which the sand bed (not shown) has been removed as well as the intermediate floor (previously located at level 3 in the figure) upon which this sand bed used to stand. In the example shown, the sand filter in question had a waste water treatment capacity of 7600 m3 per day, which corresponds to a conventional treatment capacity in this field.

As seen in FIGS. 1 and 2, the device comprises a substantially parallelepipedic filtration basin 2, comprising a bottom floor 4, side walls 5 and a ceiling 6. A lateral part 7 comprises the connecting points for the drain 8 and the raw water 9.

In the example envisaged here, the dimensions of the filtration basin 2 are approximately 30 m2 at the level of the bottom floor 4, and six meters of height under the ceiling, which determines a maximum water pressure which is capable of being created in this filtration basin 2 of 0.6 bar. These dimensions in particular condition the sizing of the walls, the evacuation means, etc. This infrastructure is of a type known to those skilled in the art and is not therefore described in more detail above.

In the filtration basin 2 there have been installed channels 10 for the evacuation of membrane washing sludges, located approximately at mid-height of the filtration basin 2, and normally immersed in the waste water (also called raw water) during the filtration phase, as will be seen below. These channels 10 are made from conventional material and are connected to the drain by means of the connecting point 8.

On the floor 4 of the filtration basin 2 are disposed four groups 11 each one comprising twenty filtration modules 12. The filtration modules 12 are disposed in eight parallel lines of ten modules 12 (two lines per group 11), regularly spaced on the floor 4 of the filtration basin 2.

The membrane modules 12 are connected in pairs by connecting pipes 13 and are fed with raw water by feed pipes 14, whose top part forms a bend 15, such that the end of each pipe 16 faces downwards and is located above a channel 10 for evacuating the membrane washing sludges.

It is understood that by means of this arrangement it is possible either to feed raw water into the filtration modules 12, when the water level is above the tops of the pipes 14, or to evacuate the membrane washing sludges into the channels 10 and the drain, when operating in backwashing mode, with water passing through the membranes in the reverse direction to that of normal production.

The membrane modules 12 are therefore fed with raw water in their top sections, located approximately 1.2 meters above the floor 4 of the filtration basin 2. The water coming from the filtration is evacuated through the bottom section of the membranes, located approximately 40 cm above the bottom floor 4 of the filtration basin 2.

The filtered water is collected, for each group 11, by a substantially horizontal collector pipe 17 which traverses the side wall 5 of the filtration basin 2 through a seal 18. A collector of large diameter 19 connects the collector pipes 17.

Figure 3:
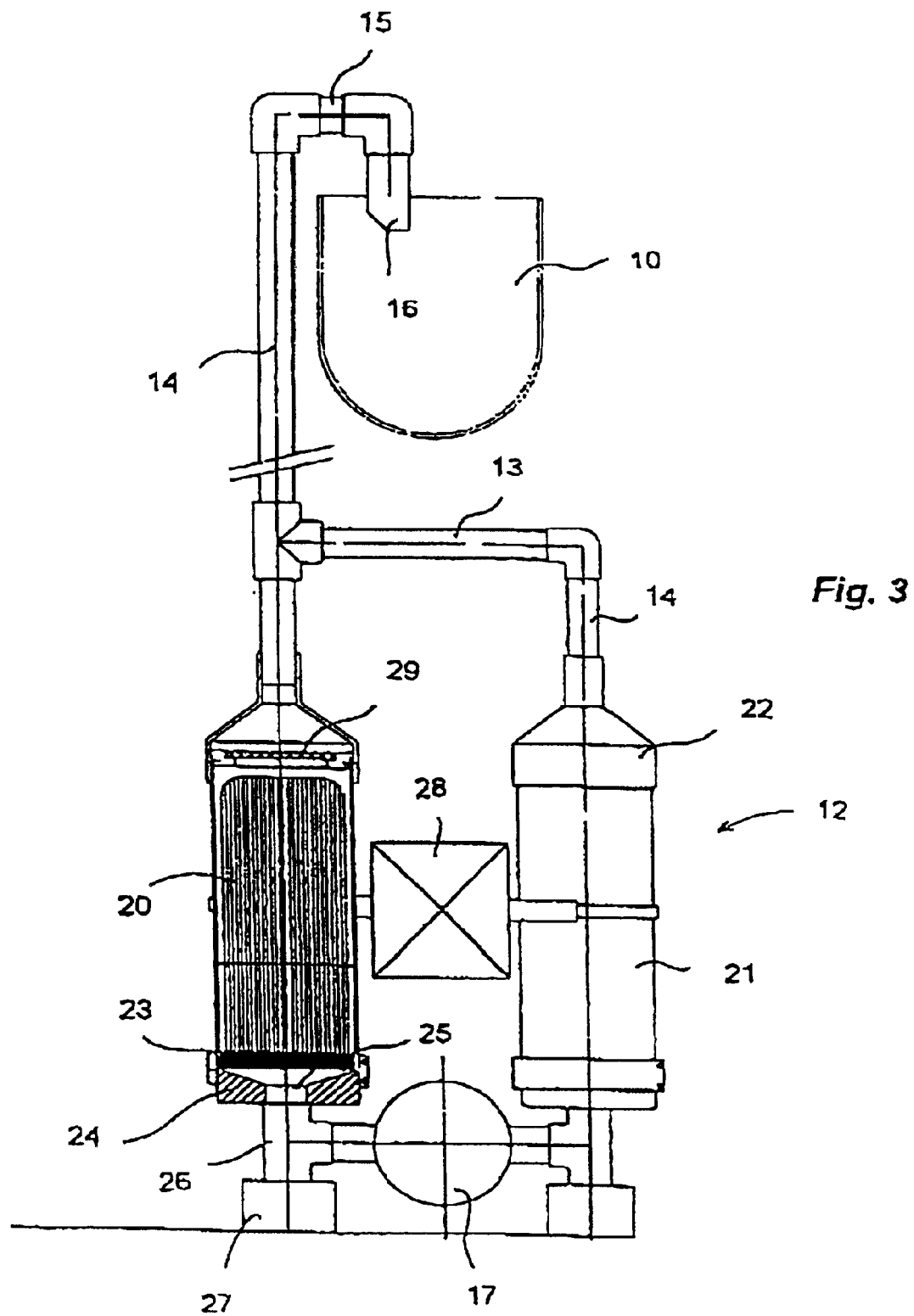
FIG. 3 is a detailed view of a filtration module and of its water feed and backwashing device.

FIG. 3 shows in greater detail the constitution of the membrane modules 12 of each group 11. Each module 12 is of the so-called "fibre with outer skin" type, the potting of the module being located at the bottom of the module. The modules, whose general type is known to those skilled in the art, have, in the example described here, a diameter of 30 cm, a height of 80 cm. and a filtration membrane area per module of 125 m2.

It is noted this in this case the membranes substantially form a "U" shape, that is to say they are more or less folded in two such that their two ends can be potted at the same place, at the bottom in this case.

This arrangement is particularly advantageous for use in basins of rather low height, the water pressure then being sufficient only at the bottom of the basin.

An additional advantage of this arrangement is the simplification of fitting and removing the membranes, in comparison with the devices in which the membranes are potted at their two longitudinal ends (in fact at the most distant points possible), and which involve more complex dismantling than in the case of the present invention.

This U-shaped membrane arrangement also explains the short and fat appearance of the modules used here.

As seen in FIG. 3, each module comprises, around hollow fibers 20 which carry out the effective filtration when the water pressure is sufficient, a cylindrical container 21 terminated at the top by a section of cone 22 which is connected to the raw water feed pipe 14. At the bottom of the module, the fibers 20 are attached to a support 23, in such a way that their central hollow sections which retrieve the filtered water, can empty out under this support 23. Each cylindrical container 21 comprises a bottom 24, having a bore 25 designed to allow the collection of the filtered water in a pipe 26 connected to one of the collectors 17. The modules 12 are disposed on mechanical supports 27 of current type, placed on the bottom floor 4 of the filtration basin 2. Mechanical structures 28 located, for each group 11, at mid-height of the modules 12, make it possible to hold them firmly together.

Figure 4:
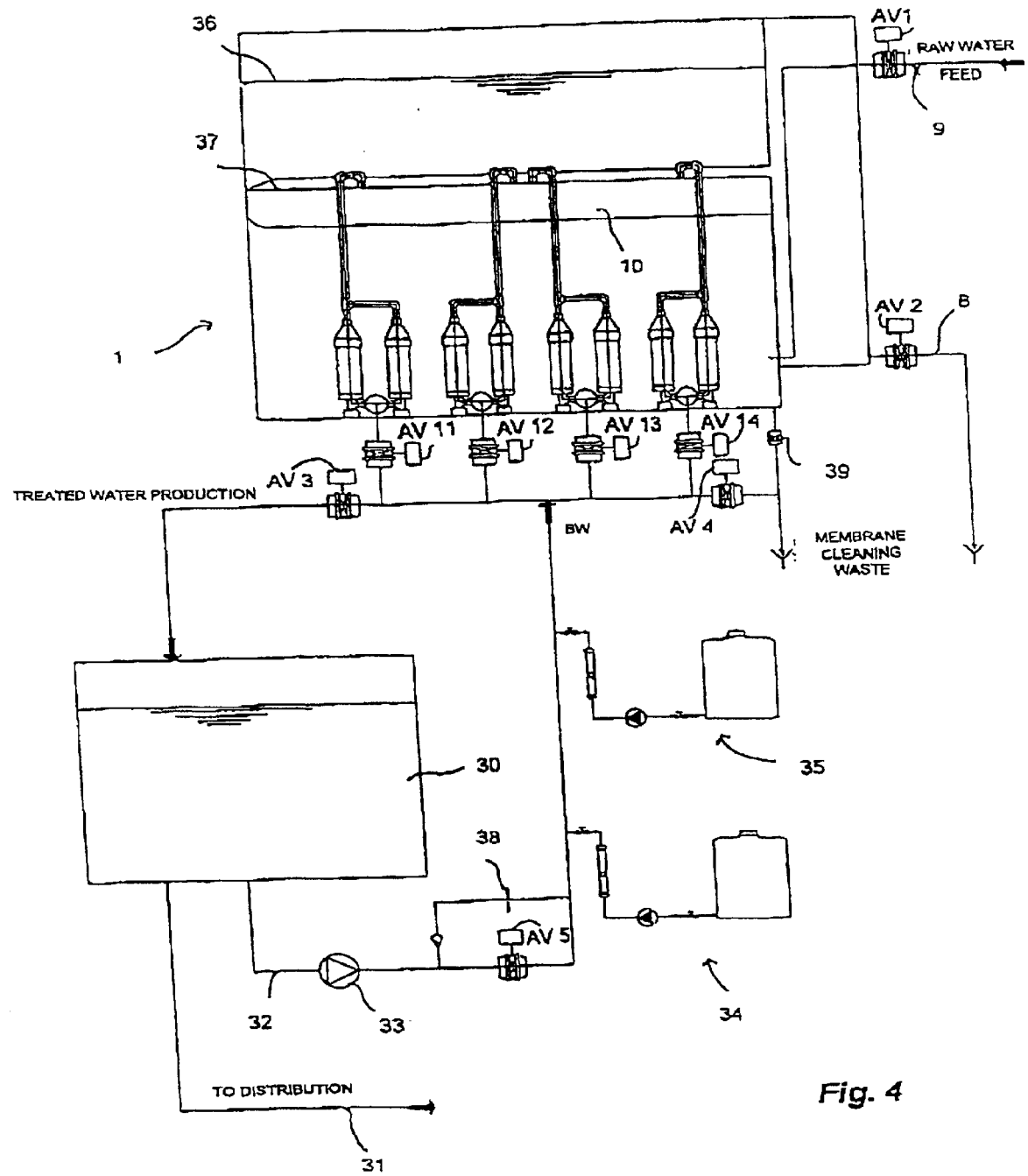
FIG. 4 is a diagrammatic representation of the operation of the installation.

FIG. 4 is the connection diagram for the various elements of the filtration unit and the control valves provided. As can be seen, valves AV11, AV 12, AV 13, AV 14 are installed at the outlets on the collector pipes. These valves are of conventional type. Valves are also disposed on the raw water feed pipe (valve referenced AV 1) and on the produced treated water outlet (valve referenced AV3), the said produced water being stored in a treated water tank 30 (of conventional type). Valves are also installed, on the one hand, for allowing the drainage of the filtration chamber 2 into the drain (valve AV2) and, on the other hand, to allow the evacuation of water from the collector 17 into the drain (valve AV4).

At the outlet of the produced water tank 30, the pure water is either returned to the user distribution system by a pipe 31 or is re-injected into the collector 17 through a backwashing line 32, on which is fitted a re-injection pump 33 and a re-injection valve AV5. Stations for the injection of chlorine 34 and for the injection of soda 35 are also connected to this backwashing line 32. These elements are of known current types.

The preceding valves are of the automatic type and are therefore controllable, either by remote control or by servo-control, with control logic.

A valve 39 called the "manual drainage" valve is connected to the bottom of the filtration basin 2. It is provided for draining the water from the basin if it is desired, in particular, to drain it in order to clean it. This exceptional maintenance operation (in practice annual) of the basin does not justify an automatic valve.

The various phases of the method are those conventionally encountered in methods of the ultrafiltration or microfiltration type adapted to the treatment of water, namely:

filtration, regular backwashings (interval of the order of a few hours) with or without the addition of chemical agents in the backwashing water (oxidants, base etc), so-called "chemical" washings with high doses of chemical product, these long washes being carried out with a time interval of the order of few weeks.

In the filtration stage, the raw water to be filtered is introduced through the bottom of the filtration basin 2 (in the vicinity of the bottom floor 4) and after a certain filling time reaches the level 36, called the "production level" and in the present example located at about 5.3 m above the bottom floor 4. The raw water fills the filtration modules 12 through each of the forty feed pipes 14 located above the modules. Under the effect of the pressure existing on the surface of the membranes (of the order of 0.4 to 0.5 bar) the ultrafiltration occurs, the water passing through the walls of fibers 20. It is noted that the ultrafiltration takes place at constant pressure, depending on the height of water in the filtration basin 2. The filtered water (permeate) flows through the collector pipes 17 ("feeders") located at the bottom of the basin, towards the water production. The flow of filtered water is governed simply by gravity.

During this phase, the valves of the collector pipes AV11, AV12, AV13, AV14 and the raw water feed valve AV1 and the produced water output valve AV3 are open, whilst the drainage valve AV2 of the filtration chamber 2, the valve AV4 for evacuating water from the collector 17 to the drain and the valve AV5 for re-injecting produced water into the collector are closed.

In the backwashing stage, the water level in the filtration basin 2 is lowered to the level 37, called the "backwashing water level", and located at the level of the channels 10. It is possible to proceed in two ways to achieve this:

1/ either the raw water feed valve AV1 is closed and filtration is maintained whilst the pressure progressively drops with the level of water in the basin.

2/ or the raw water feed valve AV1 and the valve AV3 for treated production water to the treated water tank 30 is closed, and the valve AV2 for drainage through the channels 10 of the filtration chamber into the drain is opened.

When the backwashing water level 37 is achieved, the backwashing of each of the groups 11 of two lines of ten modules 12 is carried out line by line. For a given line, the raw water feed valve AV1 and the valve AV3, between the treated production water and the treated water tank 30, and the valves of the collector pipes not corresponding to the treated line (AV12, AV13, AV14 for example if the treated line corresponds to the valve AV11) are closed and the valve AV2 for draining the filtration basin 2 into the drain is opened. Then the reinjection valve AV5 is opened and the re-injection pump 33 is started (backwashing pressure approximately 1.5 bar). Chlorine can be injected by the injection station 34, depending on the preceding operating conditions of the installation, in a way known to those skilled in the art.

In this arrangement of valves, the produced water passes through the membranes 12 again and the backwashing water thus produced, dirty and possibly chlorinated, rises up through the feed pipes 14 and spills into the channels 10 and is thus directed towards the drain via the open drainage valve AV2.

At the end of the backwashing, the addition of chlorine is stopped in order to rinse out the modules 12 and the feed pipes 14 with clean produced water.

Each line of modules 12 is thus backwashed every few hours in the same way.

At the end of the backwashing, there is a return to the filtration phase (production) by closing the re-injection valve AV5 and the drainage valve AV2 of the filtration basin 2 and reopening the treated water production valve AV3 and all the valves of the collectors 17 of the groups 11 of modules 12, and, by opening the raw water feed valve AV1, the raw water level in the filtration basin 2 is returned to the production level 36.

When the backwashings are not sufficient to restore the permeability of the membranes 12, and in practice every few weeks, a "chemical" washing is carried out, which consists in filling the modules 12 with a cleaning solution, (for example a solution of soda), in leaving the solution to act and then rinsing the modules 12 by backwashing as described above.

The procedure is as follows: the water level in the filtration basin 2 is lowered to the backwashing level 36 by one of the two methods described above in the preliminary stage of the backwashing.

The raw water feed valve AV1, the treated water production AV3, the collector drainage valve AV4, and the re-injection valve AV5 are closed whilst the collector pipe valves (AV11, AV12, AV13, AV14) and the drainage valve AV2 are opened and the reinjection pump 33 is started.

The produced water is then re-injected at the low flow rate due to a flow rate limiter 38 installed in parallel with the re-injection pump 33. The soda injection station 35 is started. The excess water taken into the modules 12 is evacuated through the feed pipes 14 into the channels 12 and the drain via the drainage valve AV2. When the modules 12 are determined to be full of cleaning solution, the re-injection pump 33 is stopped. The membranes 12 are then soaked for about 30 minutes. The opening of the drainage valve of the collector AV4 then allows the concentrated cleaning solution to be drained into the drain. This drainage valve AV4 is then closed again and each of the lines is then rinsed by non-chlorinated backwashing in accordance with the preceding description, the drainage valve AV2 being open.

It is clear that it is possible to use several cleaning solutions successively in order to wash the modules. When all of the lines have been rinsed, there is a return to filtration mode as described at the end of the backwashing phase.

Furthermore, it should be noted that the drainage valve of the collector AV4 is used in production for rinsing the modules 12 clear of the storage solution generally used whilst putting the modules 12 into service.

It is possible to carry out an air integrity test group by group. For example, for a given group, compressed air is injected into the collector of the group (through a device which is not shown but which is known to those skilled in the art), the produced water valve of the collector being closed, and the water contained on the permeate side is thus emptied by reverse filtration (permeation). The group is then tested by stopping the supply of compressed air and measuring the pressure drop. In the absence of broken fibers, the air pressure remains constant, the air not being able to pass through the wall of the ultrafiltration membrane. In the opposite case, the air pressure will reduce in a measurable manner, which makes it possible to easily prove the presence of broken fibers in the group.

In order to determine the source of the leakage in a particular module, once the faulty group is identified, it is necessary to drain the basin, disconnect the feed pipe 14 above the module 12 to be tested and replace it by a stopper provided with a compressed air feed and the module is tested by pressurizing the outer side of the fibers 20. The faulty modules must then be removed for repair.

It should be noted that most of the existing installations for making water drinkable (of the sand bed type) already have a compressor, because compressed air is most often available on treatment sites, and this existing compressor is therefore reused in the new installation, which contributes to a saving of new means to be installed.

It is understood that, in comparison with an ultrafiltration installation of conventional type, the present installation is easily combined with the reuse the preliminary treatments (such as lime softening) and with the post-treatments to come (such as nanofiltration.

In this case existing civil engineering works are reused with few modifications, the necessary civil engineering is cheap and the chassis of the device is reduced to a very simple device. The forcing pump (injection of raw water) is reused.

The method is simple because it works at constant pressure and at variable flow rate, with automatic operation linked with the height of water in the basin, and therefore very simple and requiring little instrumentation. This is a major advantage in comparison with known devices in this field which, on the contrary, work with variable pressure and with constant flow rate, which gives rise to the installation of a complex and costly pressure regulating system.

The operation at low pressure favors a stable operation of the membranes and minimizes the chemical washings and the mechanical ageing of the membranes, and therefore the risk of breakage, along with the associated maintenance times.

Because of the lower operating pressure than in the conventional devices, there is used, for an equal production, a bigger area of membranes (with an operating pressure of 0.4 to 0.5 bar, there is in this case a filtration flow of about 36 l/hm2), but in this case it is also a matter of membranes with outer skins, and therefore cheap (the price of the membrane modules 12 being in fact proportional to their volume and not to the area of the membranes).

It is therefore possible to show that, in comparison with membrane modules of conventional type, the saving in volume of the modules necessary for equal production is very significant in terms of the cost of parts and therefore of operation of the installation.

Figure 5:
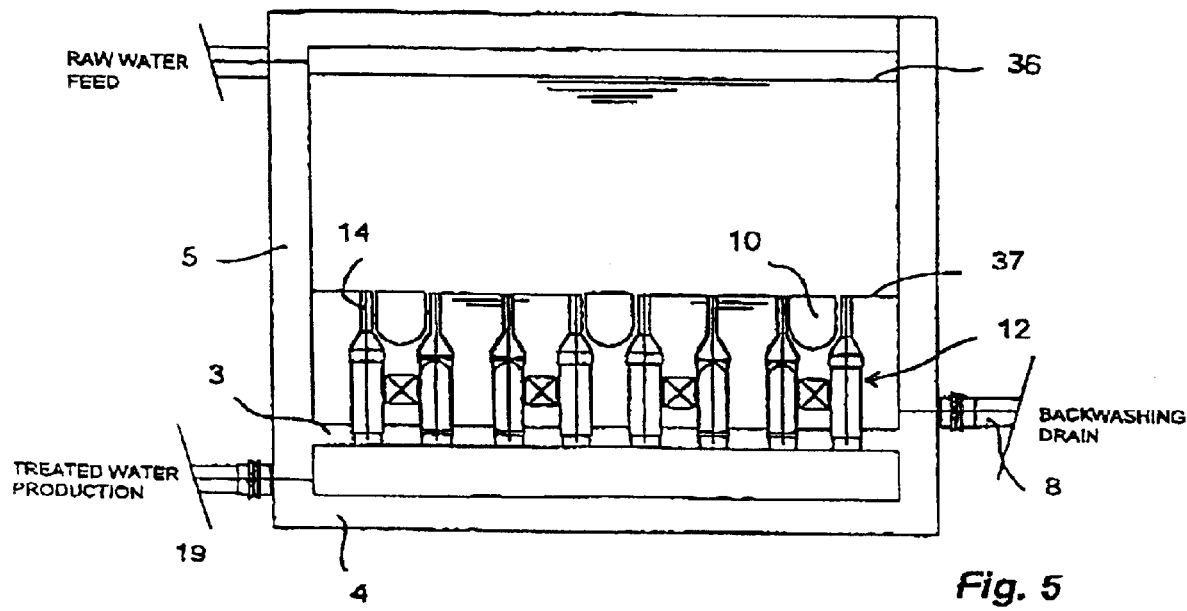
FIG. 5 is a cross-sectional view of a variant of the filtering floor device.
Figure 6:
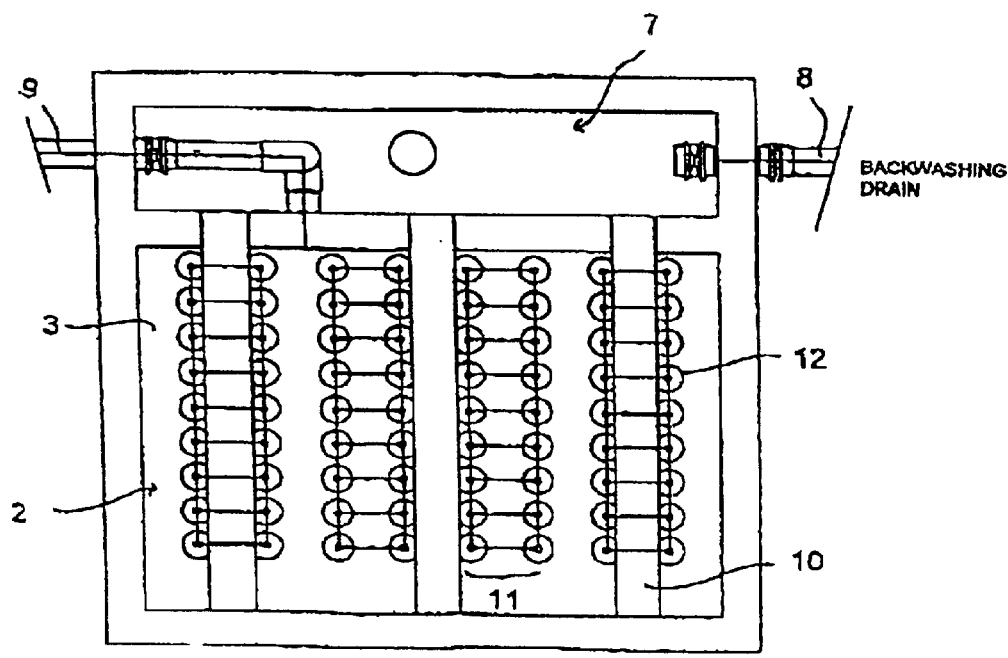
FIG. 6 is a top view of the same installation.
Figure 7:
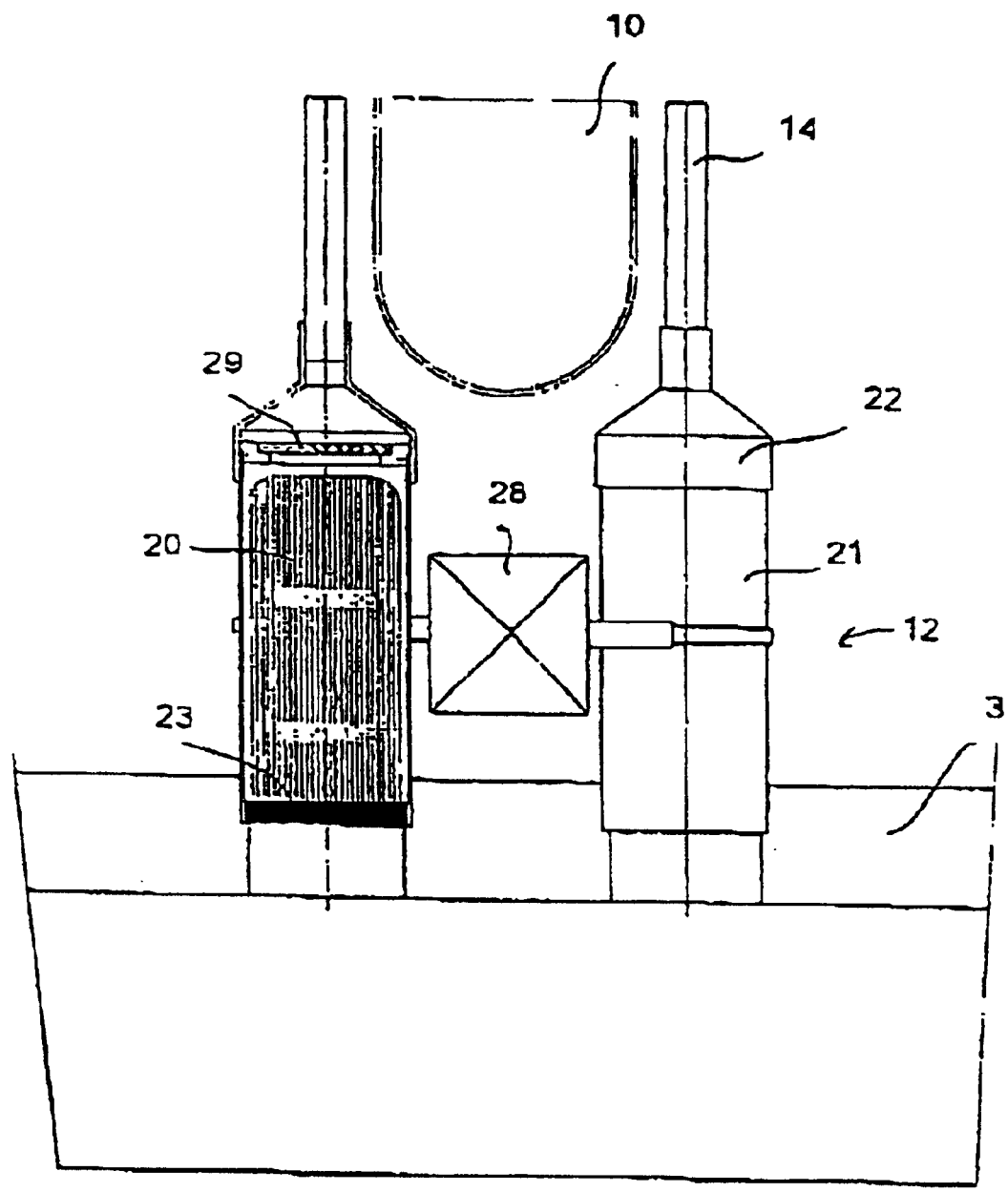
FIG. 7 is a detail view of this variant.

An advantageous variant is shown in FIGS. 5 to 7. This variant comprises two significant modifications with respect to the device shown in FIGS. 1 and 2.

On the one hand, the intermediate floor 3 of the original sand bed is not removed here but is modified in that it is provided with orifices adapted to allow the passage of the heads of the filtration modules 12, these modules being disposed on seals.

This is therefore an arrangement which well justifies the term "filtering floor". This arrangement, whose operating principle is substantially identical to the preceding description, has the advantage of reusing even more the existing civil engineering works and of reducing the volume of new pipes to install (elimination of the mechanical supports 27 and of the collector pipes 17 among other things).

Furthermore, the channels 10 for evacuation of the membrane washing sludges are in this case located just above the tops of the filtration modules 12. These channels 10 are connected to the drain by the intermediary of the connection point 8 as before.

As can be seen in FIG. 6, on the intermediate floor 3 of the filtration basin 2 there are disposed four groups 11, each one comprising twenty filtration modules 12, in a way similar to that of the arrangement of FIG. 2.

The membrane modules 12 are fed with raw water through their top sections as before. The water coming from the filtration is evacuated through the bottom section of the membranes, that is to say directly under the intermediate floor 3.

The filtered water is collected by a device not described in detail but which is conventional in this field.

FIG. 7 shows in greater detail the arrangement of membranes 12 on the intermediate floor 3.

In this variant embodiment, the operation is generally identical to that which was described above. However, with regard to the backwashing, the water level in the filtration basin 2 must be lowered down to level 37 called the "backwashing water level" and located at the level of the channels 10, which is therefore distinctly lower than in the embodiment described above.

In another variant-embodiment, it is possible to envisage replacing the raw water with waste water, which contains a concentration of matters in suspension which is much higher than for raw water. In this variant, it is necessary to agitate the bundle of membranes in order to prevent the clogging of the membranes. A flow of air bubbles provides a solution to this problem.

In yet another variant, air is injected at the bottom of the membranes in order to agitate the waste water, during the filtration phase, according to a technique known to those skilled in the art.

Figure 8:
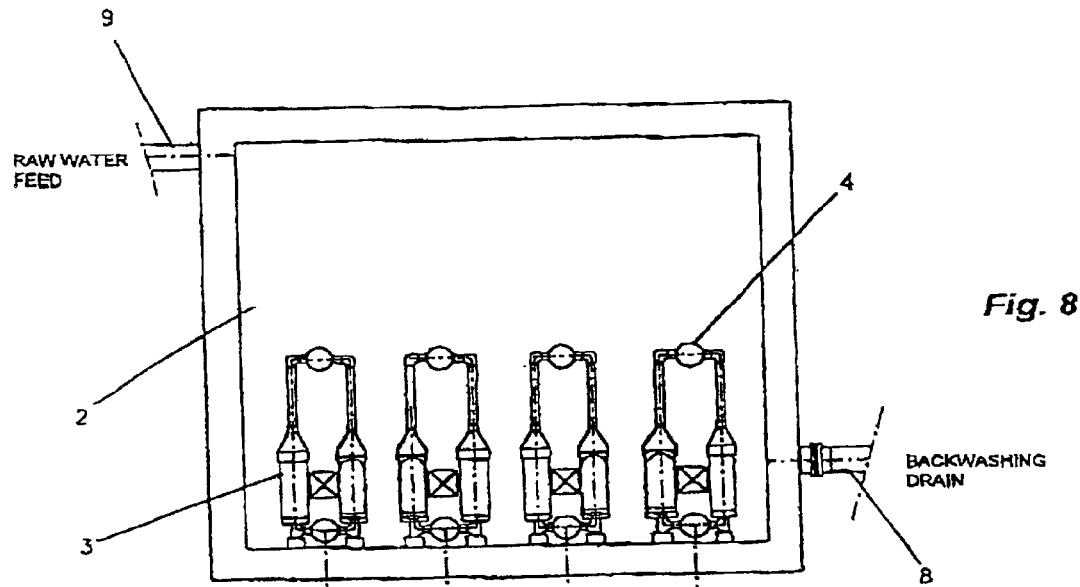
FIG. 8 is a side view of a variant of the water filtration installation.
Figure 9:
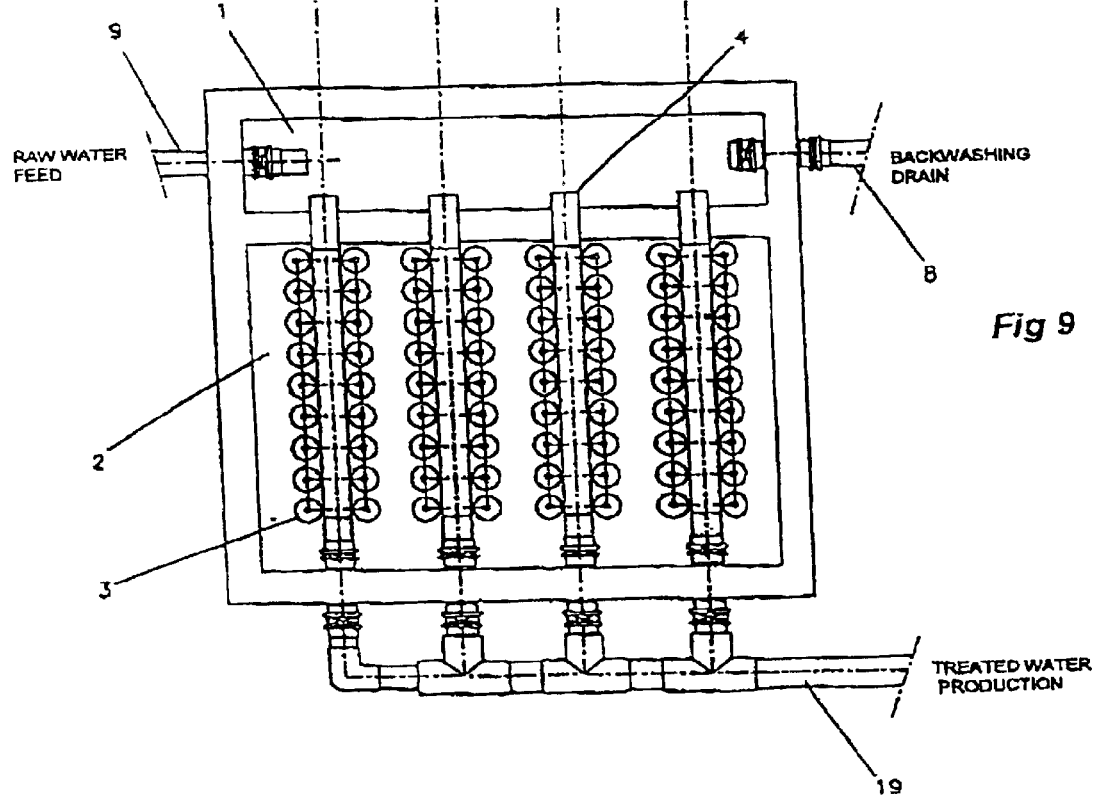
FIG. 9 is a top view of the same installation.

In a variant shown in FIGS. 8 and 9, the basin 2 is divided into two compartments at least one of which is maintained dry. This dry compartment comprises the immersed membrane modules. The modules are fed with raw water by means of gravity, through closed pipes located above the modules. These pipes are also used for conveying the backwashing water out of the modules.

In the example embodiment shown in FIGS. 8 and 9, the basin is divided into two compartments, one of which is filled with raw water and gravity feeds all of the modules located in the other dry compartment, by the intermediary of pipes located above the modules. This arrangement clearly offers the advantage of allowing distinctly much easier maintenance of the modules.

It is therefore clear that in general, according to the present invention, the membranes are immersed in a volume of water whose height allows filtration, this volume being able to be a basin full of water in which the membranes are immersed, or simply a volume formed by a membrane module, connected by pipes to a height of water adapted to create a pressure sufficient for filtration by the membranes.

In a variant arrangement of the hollow fibers, the latter are potted at just one of their two ends, the other end simply being obturated. In this case, the sole filtrate outlet is again disposed at the bottom of the module.

The scope of the present invention is not limited to the details of the above embodiments considered by way of example but, on the contrary, extends to modifications within the capability of those skilled in the art.

What is claimed is:

1. Installation for filtration of water by membranes, the installation comprising a main raw water inlet, a connection to a drain, an outlet of produced water, wherein a filtration volume filled with water to be filtered has a height of water adapted to create a differential pressure sufficient to provoke filtration through the membranes, wherein the membranes are of fibre with outer skin substantially disposed in a U-shape, whose two open ends are located downward, potting being carried out at the low point of the membranes,
   wherein the membranes are disposed in cylindrical containers thus forming modules, each said module comprising a raw water feed pipe connected to a top section of the module to receive the water to be filtered from the main raw water inlet and being coupled to the outlet of produced water, and
   wherein the modules are disposed substantially at a bottom of a basin.

2. Installation according to claim 1, wherein the modules are gathered in groups around a filtration collector for the water coming from the filtration, to which the modules are connected.

3. Installation according to claim 2, wherein each said group comprises two substantially parallel lines of 10 modules.

4. Installation according to claim 3, wherein the modules are disposed substantially vertically.

5. Installation according to claim 2, wherein each said filtration collector comprises a valve separating the filtration collector from a transfer path of the filtered water to a produced water outlet valve and a storage.

6. Installation according to claim 5, further comprising a line for re-injection of produced water into the transfer path upstream of the produced water outlet valve and a re-injection pump located on the line.

7. Installation according to claim 6, further comprising a station for injection of chlorine and a station for injection of soda discharging into the re-injection line.

8. Installation according to claim 2, wherein the modules are disposed substantially vertically.

9. Installation according to claim 1, wherein the modules are disposed substantially vertically.

10. Installation for filtration of water by membranes, the installation comprising a main raw water inlet, a connection to a drain, an outlet of produced water, wherein a filtration volume filled with water to be filtered has a height of water adapted to create a differential pressure sufficient to provoke filtration through the membranes, wherein the membranes are of fibre with outer skin substantially disposed in a U-shape, whose two open ends are located downward, potting being carried out at the low point of the membranes,
   wherein the membranes are disposed in cylindrical containers thus forming modules, each said module comprising a raw water feed pipe connected to a top section of the module to receive the water to be filtered from the main raw water inlet and being coupled to the outlet of produced water,
   wherein the modules are disposed substantially vertically, and
   wherein the modules are disposed in a filtration basin, and further, wherein the raw water feed pipes have free ends located substantially at mid-height of the filtration basin.

11. Installation according to claim 10, wherein the raw water feed pipes are positioned such that free ends thereof are oriented downwards and wherein the installation further comprises evacuation channels located under the free ends of the raw water feed pipes, the channels being connected to a drainage valve discharging into a drain.

12. Installation for filtration of water by membranes, the installation comprising a main raw water inlet, a connection to a drain, an outlet of produced water, the membranes being immersed in a filtration volume filled with water to be filtered, whose height of water above the membranes is adapted to create a differential pressure sufficient to provoke the filtration through the membranes, wherein the membranes are of fibre with outer skin substantially disposed in a U-shape, whose two open ends are located downward, potting being carried out at the low point of the membranes,
   wherein the membranes are disposed in cylindrical containers thus forming modules, each said module comprising a raw water feed pipe connected to a top section of the module, and
   wherein the membrane modules are disposed at a bottom of a dry compartment of the installation, and wherein the modules are fed by gravity via closed ones of the raw water feed pipes with the water to be filtered said closed ones of the raw water feed pipes also serving for conveying a backwashing water.

13. Method of filtration of water by immersed ultrafiltration membranes, the filtration through the membranes being carried out using, as a source of differential pressure, the height of water present in a basin in which the membranes are immersed, the membranes are made of fibre with an outer skin, and are potted at a low point of the said membranes,
   wherein the membranes are disposed in cylindrical containers thus forming modules, each module comprising a raw water feed pipe connected to a top section of the module.

14. Method of rehabilitation of an existing sand basin water purification unit comprising a basin provided with a bottom floor, an intermediate floor on which a sand bed stands, a raw water inlet, wherein the method comprises the steps of removal of the sand bed, destruction of the intermediate floor, installation of at least one intermediate channel for the evacuation of washing sludges located substantially at mid-height of the filtration basin and closed by a valve discharging into a drain, installation on the bottom floor of a series of membrane ultrafiltration modules, the membranes being made of fibre with outer skin potted at their low point, disposed in containers, wherein the operating pressure of these membranes is created by the height of raw water stored in the basin above these membranes.

15. Method of rehabilitation according to claim 14, wherein it further comprises a phase of testing the integrity of the membranes of a group comprising the following stages:
   closing the produced water valve of a collector,
   injection of compressed air into the collector of the group,
   emptying by reverse filtration ("permeation") of the water contained on the permeate side,
   stopping the compressed air supply,
   measuring the pressure drop.

16. Installation for filtration of water by membranes, the installation comprising a main raw water inlet, a connection to a drain, an outlet of produced water, wherein a filtration volume filled with water to be filtered has a height of water adapted to create a differential pressure sufficient to provoke filtration through the membranes, wherein the membranes are of fibre with outer skin substantially disposed in a U-shape, whose two open ends are located downward, potting being carried out at the low point of the membranes, wherein the membranes are disposed in cylindrical containers thus forming modules, each said module comprising a raw water feed pipe connected to a top section of the module to receive the water to be filtered from the main raw water inlet and being coupled to the outlet of produced water, wherein the membrane area of each module is substantially 125 m2, and wherein the modules are disposed substantially at the bottom of a basin.

17. Installation according to claim 16, wherein the modules are cylindrical containers substantially having a diameter of 30 cm and a length of 80 cm.

18. Installation according to claim 7, wherein the modules are disposed substantially at the bottom of a basin.

19. Installation according to claim 7, wherein the modules are disposed substantially vertically.

* * * * *